US008472076B2

(12) United States Patent
Ikeda

(10) Patent No.: US 8,472,076 B2
(45) Date of Patent: Jun. 25, 2013

(54) DETECTING AND REMOVING BLUR OF A CHARACTER BY COMPARISON WITH THE ORIGINAL IMAGE AFTER A THINNING AND FATTENING OPERATION

(75) Inventor: Tohru Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 400 days.

(21) Appl. No.: 12/843,565

(22) Filed: Jul. 26, 2010

(65) Prior Publication Data

US 2011/0032581 A1 Feb. 10, 2011

(30) Foreign Application Priority Data

Aug. 5, 2009 (JP) ................................. 2009-182888

(51) Int. Cl.
*H04N 1/40* (2006.01)
*H04N 1/409* (2006.01)
*G06T 5/30* (2006.01)
*G06T 5/50* (2006.01)
*G06K 9/44* (2006.01)
*G06T 5/00* (2006.01)

(52) U.S. Cl.
CPC ..................................... *G06T 5/003* (2013.01)
USPC ........... 358/1.9; 358/3.26; 358/448; 358/463; 382/256; 382/266

(58) Field of Classification Search
USPC ................. 358/1.9, 3.26, 501, 502, 518, 532, 358/537, 540, 448, 461, 452, 463, 296, 300; 382/256–258, 266, 269, 275
See application file for complete search history.

(56) References Cited

U.S. PATENT DOCUMENTS

| 4,010,446 | A | * | 3/1977 | Kawa ............................. 382/258 |
| 5,065,437 | A | * | 11/1991 | Bloomberg .................... 382/258 |
| 5,570,435 | A | * | 10/1996 | Bloomberg et al. ........... 382/257 |
| 6,058,218 | A | * | 5/2000 | Cline ............................. 382/257 |
| 6,504,949 | B2 | * | 1/2003 | Matsukubo et al. ........... 382/266 |
| 6,571,011 | B1 | * | 5/2003 | Andresen et al. .............. 358/518 |
| 6,904,181 | B1 | | 6/2005 | Shinbata et al. ............... 382/282 |

FOREIGN PATENT DOCUMENTS

| JP | 2000-036912 | 2/2000 |
| JP | 2007-104277 | 4/2007 |

* cited by examiner

*Primary Examiner* — Scott A Rogers
(74) *Attorney, Agent, or Firm* — Fitzpatrick, Cella, Harper & Scinto

(57) ABSTRACT

This invention is directed to an image processing apparatus and method capable of analyzing a character image to detect a blur, and reducing the blur on a printed product. According to the method, a scanner reads an original character image, generating image data. A blur and deterioration of a character image represented by the image data are detected. Portions corresponding to the detected blur or the deterioration are removed from the image data. The image data from which the portions corresponding to the blur or the deterioration are removed is output to an image output unit.

13 Claims, 6 Drawing Sheets

DETECTING AND REMOVING BLUR OF A CHARACTER BY COMPARISON WITH THE ORIGINAL IMAGE AFTER A THINNING AND FATTENING OPERATION

BACKGROUND OF THE INVENTION

1. Field of the Invention

The present invention relates to an image processing apparatus, image processing system, and image processing method. Particularly, the present invention relates to an image processing apparatus, image processing system, and image processing method for analyzing an input image.

2. Description of the Related Art

Recently, very precise images can be printed thanks to the development of an image processing technology and computer graphic technology. However, specific kinds of blur appears in a printed product, depending on the printing method (process) and printing medium (for example, paper). The occurrence of a blur on a printed product stems from a variety of causes. When ink permeates a sheet along the fibers of the paper comprising the sheet, or when ink cannot be fixed on the paper surface under the influence of the non-affinity of a substance contained in paper for the ink solvent, ink scattering, a blur on the transfer drum, misalignment on the transfer drum in exposure, or the like appears.

An image blur arises from various causes dependent on a printing method adapted in a printer.

For example, in an electrophotographic printer which prints (renders) an image by exposing a photosensitive material with a light beam, the spot of the light beam on the photosensitive material surface slightly spreads from a proper one due to an optical error or the like, and exposes even a portion that is not supposed to be exposed. The spread size of the spot of the light beam sometimes differs between beams corresponding to exposure in R (Red), G (Green), and B (Blue) colors. If the exposure amount at a portion which is not supposed to be exposed reaches a certain amount due to the spread of the light beam spot, the photosensitive materials unnecessarily develop the color. This results in a detail loss at a minute and highlighted portion such as a thin line, or a color blur or the like arising from the difference in the sizes of respective color light beams in a thin outline character formed in a high-density area, black and white thin stripes, or the like.

In an inkjet printer, ink dots spread undesirably, due to an error of the discharged ink amount, and/or an ink blur or the like upon attachment of ink droplets to a printing medium. Further, a single ink droplet is divided into a plurality of droplets until it reaches a printing medium, and the droplets scatter on the printing medium. These causes generate a detail loss and color blur at a minute and highlighted printed portion.

Typographic printing suffers fatting caused by ink overflow.

Consequently, an image detail loss, image blur, and the like appear in a character, a thin line, a thin outline character, white ones of black and white thin stripes, a white minute point, and the like, causing a deterioration in the image quality. They stand out much more at a minute and highlighted portion in an image.

The detail loss and color blur can be suppressed to a certain degree by mp adjustment in shipment of a printing apparatus (printer) or the like. However, the detail loss and color blur of a thin line change depending on the apparatus state, and the lots of consumables including the photosensitive material, printing medium (for example, paper), developer, and ink. In addition, the optimum adjustment value changes according to users' preferences. At present, it is difficult to preferably suppress detail loss and color blur at a minute and highlighted portion in accordance with each apparatus and user.

There is disclosed a technique of suppressing image detail loss and color blur in a thin line character, a minute pattern, and the like in an image forming apparatus such as a digital photo printer, electrophotographic printer, or inkjet printer (for example, Japanese Patent Laid-Open No. 2007-104277).

However, measures are not taken against all kinds of printed products. For example, there is an image document suffering a blur as shown in FIG. 5.

When an image deteriorated by the above-mentioned blur or the like is input using a scanner, camera, or the like, even the blur is accurately read. The input image is faithful to an original one, but even unnecessary information is reproduced. For example, Japanese Patent Laid-Open No. 2000-36912 discloses a technique of correcting image deterioration by a scanner for the purpose of faithful reproduction.

The above conventional technique can perform line width control for a character image area, but cannot reduce an image blur or the like.

There has also been disclosed a technique of changing notch processing that is uniformly performed over an entire printed document in accordance with the resolution in image printing. In this technique, however, it is not determined whether an input image blurs, so an entire printed image has to be uniformly processed. If a printed image partially blurs, the blur cannot be effectively reduced.

SUMMARY OF THE INVENTION

Accordingly, the present invention is conceived as a response to the above-described disadvantages of the conventional art.

For example, an image processing apparatus, image processing system, and image processing method according to this invention are capable of analyzing a character image to detect a blur, and reducing the blur on a printed product.

According to one aspect of the present invention, there is provided an image processing method of processing image data generated by reading an original character image by a scanner, the method comprising: a detection step of detecting a blur and deterioration of a character image represented by the image data; a removal step of removing, from the image data, portions corresponding to the blur or the deterioration detected in the detection step; and an output step of outputting, to an image output unit, the image data from which the portions corresponding to the blur or the deterioration are removed in the removal step.

According to another aspect of the present invention, there is provided a computer readable memory storing a program to be executed in a computer, wherein the program includes each step recited in the above method.

According to still another aspect of the present invention, there is provided an image processing system comprising: a scanner which reads an original character image to generate image data; a computer which receives the image data generated by the scanner, detects a blur and deterioration of a character image represented by the image data, removes portions corresponding to the detected blur or the deterioration from the image data, and outputs the image data from which the portions corresponding to the blur or the deterioration are removed; and a printer which prints an image based on the image data output from the computer on a printing medium.

According to still another aspect of the present invention, there is provided an image processing apparatus comprising: a scanner unit configured to read an original character image to generate image data; a detection unit configured to detect a blur and deterioration of a character image represented by the image data generated by the scanner unit; a removal unit configured to remove, from the image data, portions corresponding to the blur or the deterioration detected by the detection unit; an output unit configured to output the image data from which the removal unit removes the portions corresponding to the blur or the deterioration; and a printer unit configured to print an image based on the image data output from the output unit.

The invention is particularly advantageous since a blur and deterioration in an input image document can be automatically detected and removed.

Further features of the present invention will become apparent from the following description of exemplary embodiments (with reference to the attached drawings).

DESCRIPTION OF THE EMBODIMENT

An exemplary embodiment of the present invention will now be described in detail in accordance with the accompanying drawings. It should be noted that the relative arrangement of the building components and the like set forth in the embodiment do not limit the scope of the present invention unless it is specifically stated otherwise.

Figure 1:
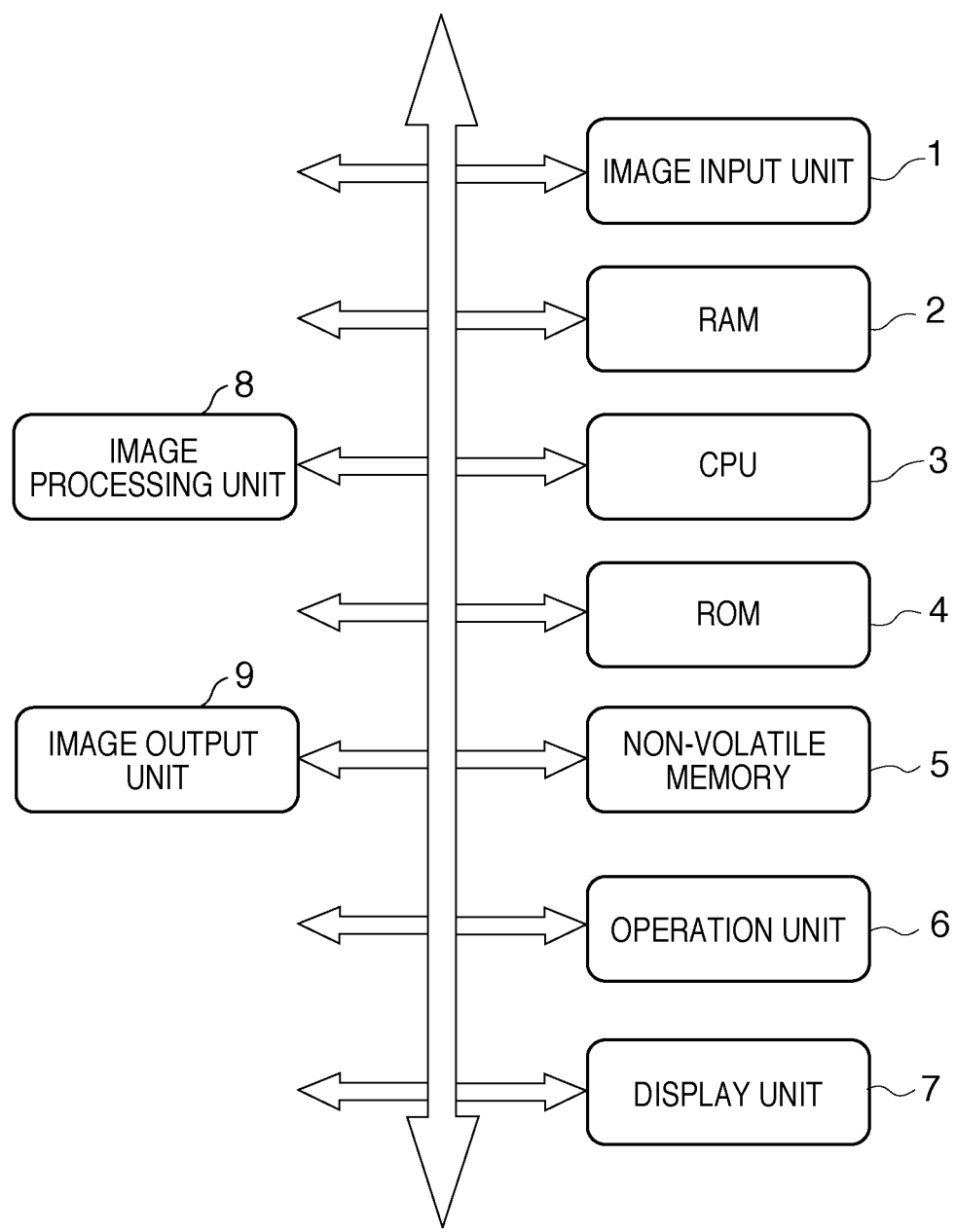
FIG. 1 is a block diagram showing the arrangement of an image processing apparatus as a typical embodiment of the present invention.

FIG. 1 is a block diagram showing the arrangement of an image processing apparatus as a typical embodiment of the present invention.

An image input unit 1 inputs image data that represents an image to be edited. More specifically, the image input unit 1 includes an interface for inputting image data which has already been electrically digitalized by a personal computer or the like, and a scanner for optically reading a document image. Reading a document image will be explained below. Image reading by the scanner will be described later.

A CPU 3 controls various functions of the image processing apparatus. Also, the CPU 3 expands, in a RAM 2, an image processing program stored in a ROM 4 and executes it in accordance with a predetermined operation instruction input from an operation unit 6. A non-volatile memory 5 is, for example, a battery-backup SRAM, EEPROM, or FeRAM, and stores data unique to the image processing apparatus.

The operation unit 6 includes a setting key for performing image edit processing, a key for making a selection and setting, a start key, a mode key, a key for switching between color printing and monochrome printing, a stop key for stopping the operation, and a ten-key pad for inputting the number of output copies. The CPU 3 detects the pressed states of these keys, and controls respective units in accordance with the states.

A display unit 7 includes a dot matrix type liquid crystal display (LCD) and LCD driver. The display unit 7 provides various displays under the control of the CPU 3. The display unit 7 displays the thumbnail image of a scanned document image. An image output unit 9 is formed from an inkjet printer or electrophotographic printer, an IC for controlling the printer, and the like. Under the control of the CPU 3, the image output unit 9 reads out print data which is bitmapped in the RAM 2, and outputs it as a hard copy.

An image processing unit 8 executes processing (to be described later) for image data input from the image input unit 1 in accordance with an instruction from the operation unit 6. Note that the image processing unit 8 may be implemented as a program to be executed by the CPU 3, an ASIC for higher-speed processing, or a combination of an ASIC and program.

The image output unit 9 prints out using image data processed by the image processing unit 8. The image data processed by the image processing unit 8 is displayed on the display unit 7, or saved in the non-volatile memory 5 or the like.

Figure 2:
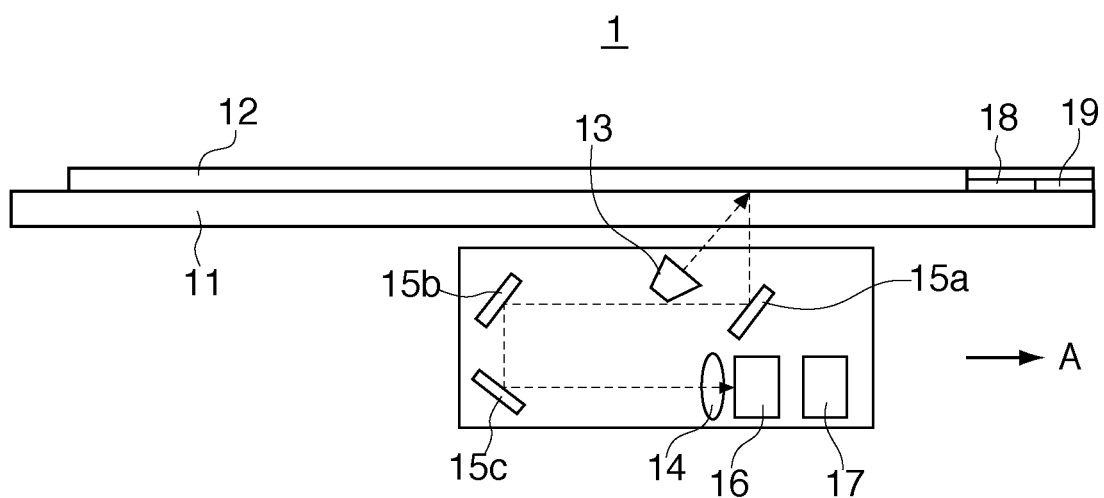
FIG. 2 is a side sectional view showing the schematic arrangement of a scanner as the specific arrangement of an image input unit 1 shown in FIG. 1.

FIG. 2 is a side sectional view exemplifying the schematic arrangement of the scanner as the specific arrangement of the image input unit 1 shown in FIG. 1.

As shown in FIG. 2, an image document 12 set on a document glass 11 is irradiated with light emitted by a light source 13. The reflected/diffused light is collected by a lens 14 via mirrors 15a, 15b, and 15c, and reaches a light-receiving sensor 16. An analog signal obtained by photoelectrical conversion by the light-receiving sensor 16 is converted into a digital signal by an electric circuit 17 formed from an analog front end. The analog-to-digital conversion generates multilevel brightness (RGB) data.

The light-receiving sensor 16 is of the CCD type or CMOS type. The following two methods are proposed for color image reading. In one method, a light source 13 for white light is used, R, G, and B filters absorb light beams having specific wavelengths, and the light-receiving sensor 16 photoelectrically converts the light beams, obtaining color image data. In the other method, a light source 13 having R, G, and B wavelengths is sequentially turned on, and the light-receiving sensor 16 photoelectrically converts the light, obtaining color image data.

The optical system generally includes a reduction optical system which reduces an image using a lens, and a system using a CIS (Contact Image Sensor) which scans an image with a sensor having a magnification equal to the image size.

In the scanner, the light source 13, lens 14, mirrors 15a to 15c, light-receiving sensor 16, and electric circuit 17 are integrated into one unit. While a driving unit moves the unit in a direction (sub-scanning direction) indicated by arrow A, an image document is read, acquiring image data. Note that the unit reads even a reference board 18 attached to the reading position of the document glass 11 for shading correction. The light-receiving sensor 16 forms a line sensor having many light-receiving sensors in a direction perpendicular to the sheet surface. The line sensor is electrically scanned to read an image in the line direction. This direction will be referred to as a main scanning direction. Movement of the unit in the sub-scanning direction uses a motor, a gear for transmitting the driving force of the motor, and a driving unit (not shown) formed from a driver circuit and the like for controlling the motor.

Image processing using the image processing apparatus having the above-described arrangement will be described.

Note that the image processing apparatus having the above-described arrangement is typified by a multi-functional printer (MFP) in which a scanner, a printer, and an interface with a personal computer are integrated into one housing.

The image processing apparatus having this arrangement may be configured as an image processing system in which the image input unit 1 functions as a separate scanner apparatus, the image output unit 9 functions as a separate printer apparatus, and the remaining building elements are provided by a personal computer. In this case, the personal computer implements the following image processing by executing an image processing program.

Figure 3:
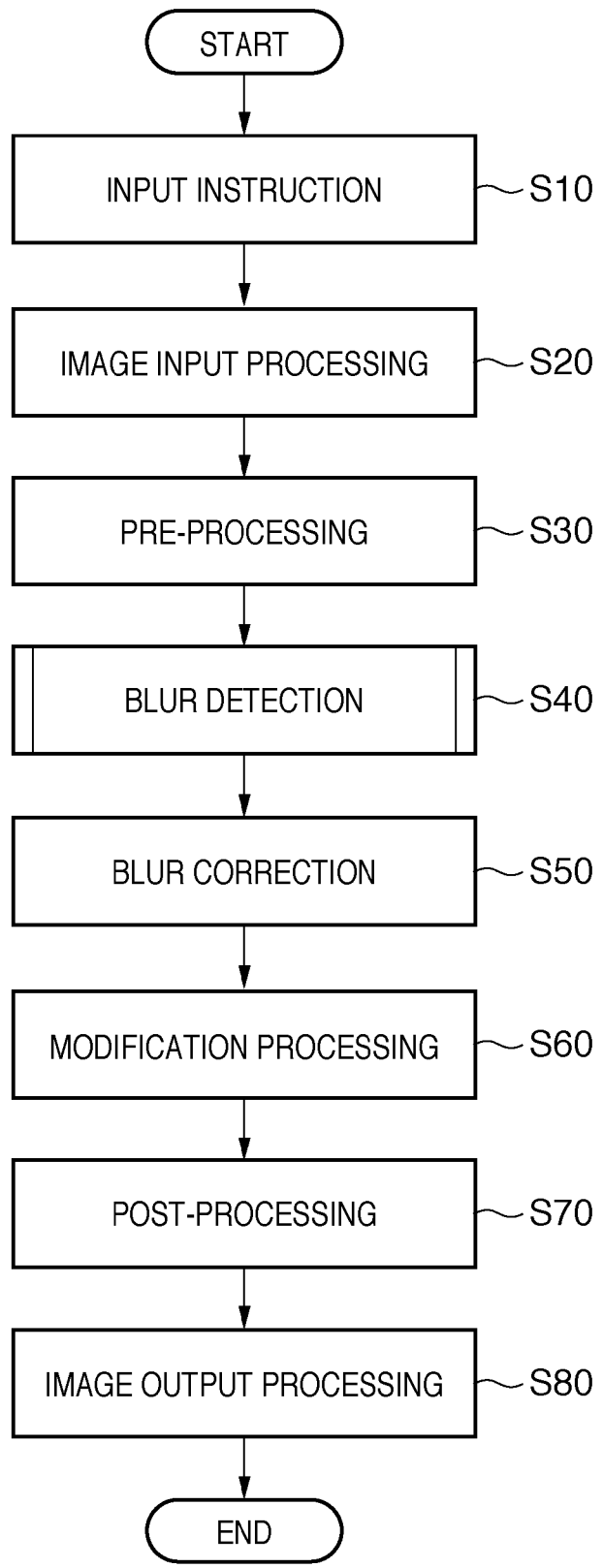
FIG. 3 is a flowchart showing a processing outline of blur detection and blur correction.

FIG. 3 is a flowchart showing a processing outline of blur detection and blur correction.

Copy processing of reading an original character image using the foregoing scanner, and printing it by the image output unit will be explained as an embodiment. Especially in the copy processing, a portion other than a character, called "whisker" which causes a blur in a character image and deterioration of the image quality, is detected and removed.

In step S10, the user inputs a copy start instruction via the operation unit 6. When blur correction is selected, reading starts in response to pressing of a copy button. In addition, the user may be allowed to select another processing using the operation unit 6 and display unit 7. For example, the user can also designate the copy range, the paper type (for example, recycled paper) of image document, and the type (for example, typographic printing, offset printing, electrophotographic printing, or inkjet printing) of printed product.

In step S20, image input processing is performed. An image document is read under predetermined conditions corresponding to a mode instructed or designated in step S10, and undergoes shading correction and the like, acquiring image data.

In step S30, input image pre-processing is executed. At this time, the image data acquired by the image input unit 1 is converted by input profile conversion into a standard color space from RGB brightness data obtained by the spectral characteristics of the device so as to perform image processing.

Figure 5:
FIG. 5 is a view exemplifying an image subjected to blur detection.

In step S40, blur detection is performed for the obtained image data. In this processing, it is determined whether a blur occurs in each pixel of input image data subjected to detection. FIG. 5 exemplifies an image subjected to blur detection. Such an image is represented as bitmap image data. At this time, whether or not thin line reproducibility is important in the target document may be determined by image area separation using the edge amount and the brightness value change amount. This determination may be executed for a document and area in which blur detection and correction are effective.

Details of blur detection will be explained.

Figure 4:
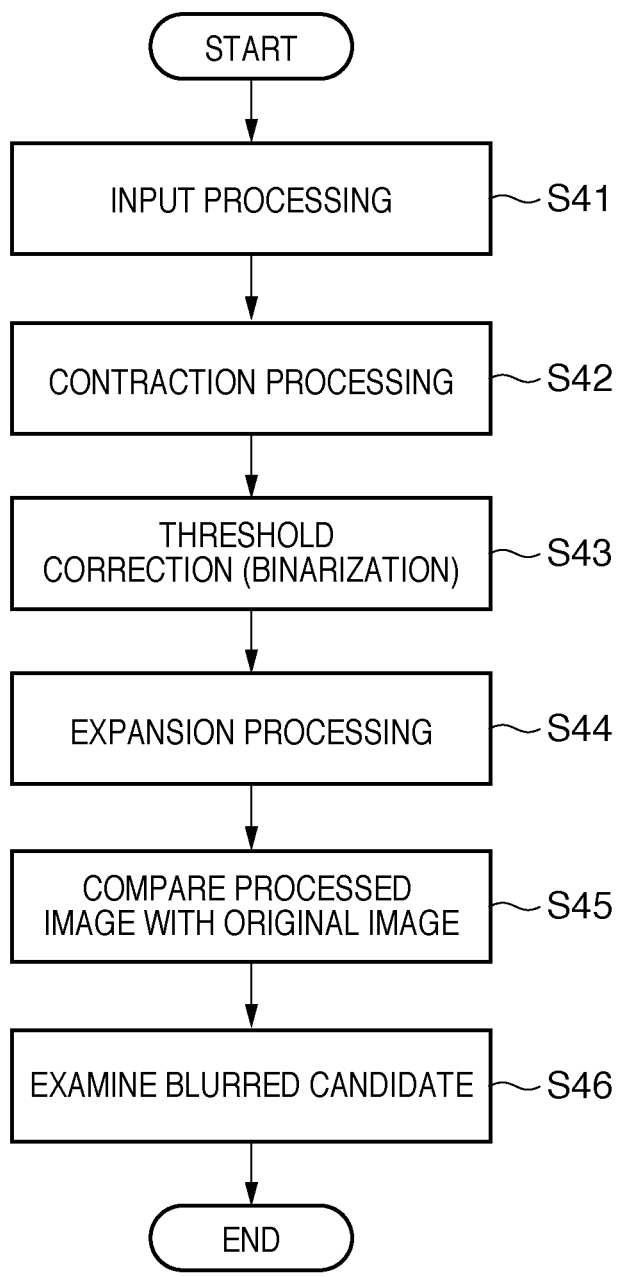
FIG. 4 is a flowchart showing details of blur detection processing using a blur detection technique.

FIG. 4 is a flowchart showing details of blur detection processing using a blur detection technique.

In step S41, image data having undergone pre-processing in step S30 of FIG. 3 is received. At this time, image area management and the like are executed to perform blur detection processing. Since real-time processing is important, image data is processed for each block (which is an area obtained by dividing image data of one page of an image document into small rectangular areas). Image analysis is performed for each block area, so a boundary area (overlapped area) between blocks is controlled. If no real-time processing is required, processing may be performed for each page using a page buffer.

In step S42, contraction processing is executed. In the contraction processing, the boundary portion of a target image is torn off by one pixel. For example, for a character image "野" in FIG. 5, each pixel which forms the character "野" is torn off from the outside so as to go around an area (for example, rectangular area) which surrounds the character "野". By repeating this processing, the character is thinned, and the target area is downsized and finally disappears. During this processing, neither an isolated point nor a thin line generated by a blur is saved. In this manner, the contraction processing is executed by a predetermined number of times. Note that the range subjected to contraction processing and the number of pixel values to be saved comply with predetermined values.

Figures 6A, 6B, 6C:
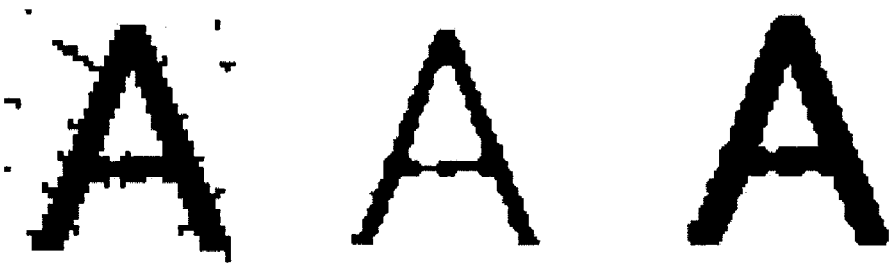
FIGS. 6A, 6B, and 6C are views exemplifying an image subjected to blur detection, an intermediate image (thinned image or frame image) during blur detection, and an image obtained by contraction/expansion processing.

For example, when an image as shown in FIG. 6A is input, the contraction processing removes isolated points and chops a thin line into pieces. The contraction processing is executed by a predetermined number of times based on a combination of a predetermined processing range and threshold, obtaining, for example, an image as shown in FIG. 6B. In FIG. 6B, isolated points, and whisker-like blurs which spread along the fibers of a printing medium are removed, obtaining a thinned figure as the character image "A".

In step S43, threshold correction is executed. Since input image data is multilevel data (represented as a binary image in FIGS. 6A to 6C), binarization based on a threshold is performed.

In step S44, expansion processing is executed. In the expansion processing, the boundary portion of a target image is fattened by one pixel. As for a character image, the outline of the character is fattened. This processing converts a constricted image or thinned image into a fat image as shown in FIG. 6C. Even in the image shown in FIG. 6C, many blurs are removed. The following processing is performed to confirm whether or not portions which have been eliminated by the contraction processing and expansion processing in steps S42 to S44 have necessary information, and whether or not information to be eliminated is still left at the remaining portions.

Figure 7:
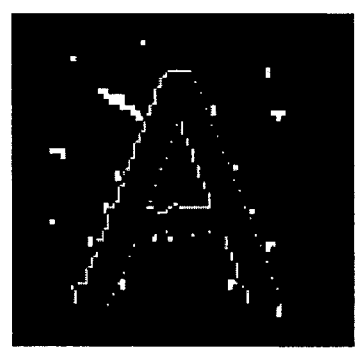
FIG. 7 is a view schematically showing a difference image before and after blur processing.

More specifically, in step S45, an original image is compared with an image obtained by the contraction processing and expansion processing. For example, the image shown in FIG. 6A and that shown in FIG. 6C are compared. By this comparison, an image shown in FIG. 7 is obtained. This image shows only pixels in which the difference between the pixel values of the two images is larger than a predetermined threshold. In FIG. 7, pixels displayed in blank are blurred candidate pixels detected in the processing of step S45. This image reveals that blurred portions exist in pixels other than those which expect correction of a blur, constriction, and the like among candidate pixels.

In step S46, blurred candidate examination processing is performed to remove pixels (other than those which expect correction) from blurred candidate pixels. More specifically, the ratio of adjacent pixels in an original image is used. For example, the certainty of a blurred candidate is determined from the frame (character portion) comprised of eight pixels adjacent to the pixel of interest in an original image and 16 pixels outside them.

An exemplary method of determining a blurred candidate pixel based on the blurred candidate results of adjacent pixels will be explained.

Figure 8:
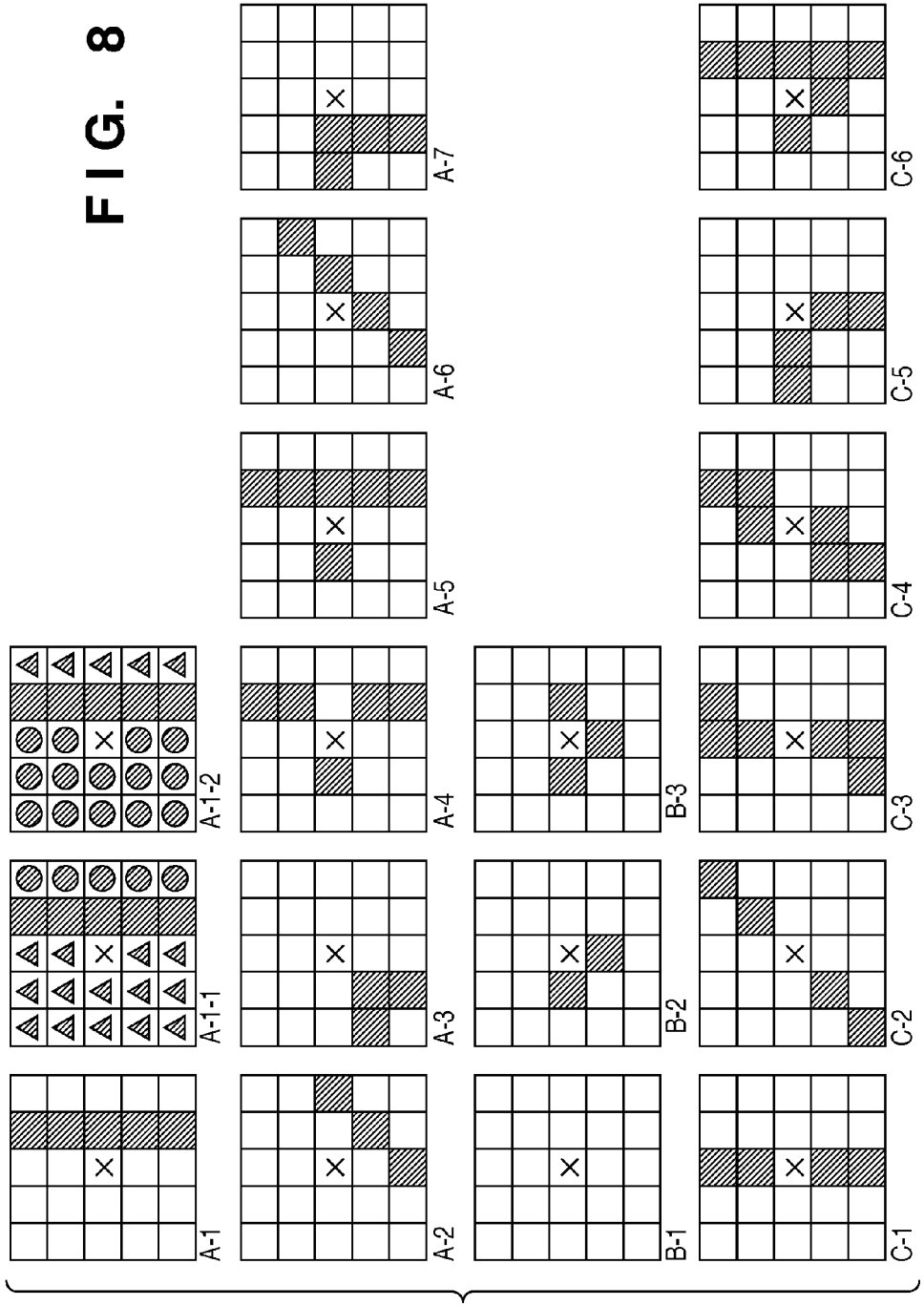
FIG. 8 is a view showing the arrangement of a typical blurred candidate pixel and blurred candidate pixels among adjacent pixels.

FIG. 8 is a view showing the arrangement of a typical blurred candidate pixel and blurred candidate pixels among adjacent pixels. In the following description, the pixel of interest is a blurred candidate pixel "X" in a 5×5 pixel matrix shown in FIG. 8. Shaded pixels are blurred candidate pixels, and non-shaded pixels are pixels which are not blurred candidates.

Examples in which the blur evaluation value is high will be explained.

Case A-1

In this case, the pixel of interest is not sandwiched between blurred candidate pixels and contacts one of successive blurred candidate pixels, and the blurred image evaluation is determined to be high (EvaA=1). As for non-shaded pixels, pixels contained in those which are not blurred candidates are further classified based on whether the target pixel is a pixel of the "thinned image" shown in FIG. 6B that has been created in step S42. In A-1, circles (●) indicate pixels of the "thinned image", which will be called frame pixels. Triangles (▲) indicate pixels other than those of the "thinned image".

By using the adjacent relationship with frame pixels, a pixel which is not adjacent to a frame pixel is determined as a blurred pixel, like A-1-1. To the contrary, when a pixel is adjacent to a frame pixel, the blurred pixel evaluation is determined to be low (EvaA=0.1), like A-1-2.

In reevaluation using frame pixels, a description of the same processes as those described above will not be repeated.

Cases A-2 and A-3

Similar to A-1, when the pixel of interest is not sandwiched between blurred candidate pixels and contacts one of successive blurred candidate pixels, the blurred image evaluation is determined to be high (EvaA=1).

Case A-4

When the pixel of interest is not sandwiched between blurred candidate pixels and contacts an omitted part of successive blurred candidate pixels, the blurred image evaluation is determined to be high (EvaA=1) even if the pixel of interest contacts a frame pixel.

Case A-5

When the pixel of interest is sandwiched between blurred candidate pixels and contacts one of successive blurred candidate pixels, the blurred image evaluation is determined to be high (EvaA=1).

Case A-6

When the pixel of interest is not sandwiched between blurred candidate pixels and contacts some of successive blurred candidate pixels, it is highly likely to be an outline portion. The blurred image evaluation value is determined to be low (EvaA=0.5).

Case A-7

When the pixel of interest is not sandwiched between blurred candidate pixels and contacts one of successive blurred candidate pixels, the possibility of a character decoration "serif" rises for a small font, as exemplified in A-7. Thus, the blurred image evaluation value is determined to be low (EvaA=0.7).

Examples in which the blur evaluation value is low will be explained.

Case B-1

In this case, the pixel of interest is not adjacent to a blurred candidate pixel. The blurred image evaluation is determined to be low (EvaA=0), but the possibility of dirt by scattering ink or toner is determined to be high (EvaB=1).

Cases B-2 and B-3

In this case, the pixel of interest is adjacent to successive blurred candidate pixels, but is not adjacent to a frame pixel. The blurred image evaluation is determined to be low (EvaA=0), but the possibility of dirt by scattering ink or toner is determined to be high (EvaB=0.9).

Cases C-1, C-2, C-3, and C-4

In these cases, the pixel of interest is sandwiched between successive blurred candidate pixels, and is highly likely to be an outline portion. Hence, both the blurred image evaluation and dirt evaluation are determined to be low (EvaA=0).

Case C-5

In this case, the pixel of interest is not sandwiched between blurred candidate pixels, contacts successive blurred candidate pixels, and is highly likely to be an outline portion. Both the blurred image evaluation and dirt evaluation are determined to be low (EvaA=0.1).

Case C-6

In this case, the pixel of interest is sandwiched between blurred candidate pixels, contacts successive blurred candidate pixels, and is highly likely to be a "serif" portion. Thus, the blurred image evaluation is determined to be low (EvaA=0.3).

Evaluation data of each pixel is created by evaluating these evaluation results:

$$Eva = F(EvaA, EvaB)$$

$$F(EvaA, EvaB) = a \times EvaA + b \times EvaB$$

or $$F(EvaA, EvaB) = a \times EvaA \times EvaB$$

(where a and b are coefficients)

Referring back to the flowchart of FIG. 3, in step S50, if the evaluation result is equal to or higher than a threshold, blur correction processing is executed. In step S40, pixels other than those which expect correction are also estimated from blurred candidate portions. In step S50, pixels finalized as blurred pixels are removed from the original image (replaced with non-shaded pixels).

In this processing, instead of completely removing blurred pixels, a blurred portion may be made less conspicuous by adding predetermined brightness data to pixels which are detected as blurred pixels in brightness data representing an original image. It is also possible to multiply, by a predetermined coefficient, the respective pixels of a frame image (thinned image) as shown in FIG. 6B which is obtained as an intermediate image from an original image during blur detection, and composite the resultant pixels.

In step S60, preset image processing (modification processing) is performed. This processing includes character emphasis accompanying copy processing, various filter processes, saturation processing, undercolor processing, and black-ink processing. In step S70, post-processing is executed, including color decomposition into ink colors (for example, C, M, Y, and K).

Finally in step S80, the image output unit 9 prints out using the generated image data.

According to the above-described embodiment, even if an image document read by a scanner blurs, the blur can be automatically detected and removed, obtaining a high-quality image.

Note that the following analysis information may be used for image analysis processing accompanying blur detection. As an image area for performing blur detection processing, the characteristics of an area which is equal to or wider than the foregoing range are analyzed. For example, a blur generated depending on ink and paper exhibits similar phenomena in similar images. More specifically, a blur is hardly localized in the printing result of a black character. By using this feature, the correlation between the blur detection result and the original image is examined. This can reduce a blur detection error and detection omission.

It is also possible to obtain the frame density of an original image using the "thinned image" shown in FIG. 6B, and change the binarization threshold in blur detection based on the information. This information may be reflected not only in blur detection, but also in a coefficient in blur correction of step S50 shown in FIG. 3.

In a faint character, both a blur and useful information are also faint. Thus, changing the threshold has an effect capable of reducing a blur while leaving useful information. For a high-density character, changing the threshold has an effect capable of removing a high-density blur. The threshold is changed depending on whether the target image is a faint (low-density) character image or high-density character image.

The spread direction of a blur along the fibers of paper is expected to have direction dependency. Based on this feature, angle analysis processing may be added to blur detection. By using this result, it is determined whether the blurred candidate portion arises from image contents or a blur. Various kinds of analysis information mentioned above may be made to correspond to the threshold of the evaluation value Eva described in step S50.

In the above description, blur detection and blur correction have been explained by exemplifying copy processing. Instead, the blur detection threshold and the degree of correction may be optimized for monitor display or data save.

The present invention may be applied to a system including a plurality of devices (for example, a host computer, interface device, reader, and printer), or an apparatus (for example, multi-functional printer) formed by a single device.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-182888, filed Aug. 5, 2009, which is hereby incorporated by reference herein in its entirety.

What is claimed is:

1. An image processing method of processing image data generated by reading an original character image by a reading unit, the method comprising:
a thinning step of thinning a character represented by the image data;
an expansion step of fattening an outline of the character thinned in the thinning step;
a detection step of detecting a blur of the character represented by the image data by comparing image data processed in the expansion step with image data generated by reading the original image;
a removal step of removing, in the image data, the blur detected in the detection step; and
an output step of outputting, to an image output unit, the image data in which the blur is removed in the removal step.

2. The method according to claim 1, wherein the thinning step is performed by:
tearing off pixels in an area which surrounds a character, from an outside in the area toward an inside in the area.

3. The method according to claim 1, wherein in the comparing, the difference between image data processed in the expansion step and image data generated by reading an original image is obtained for corresponding pixel values, and the difference is compared with a predetermined threshold, determining pixels serving as candidate pixels of the blur.

4. The method according to claim 3, further comprising a determination step of determining one of the candidate pixels as a pixel of the blur, based on a relative positional relationship between the candidate pixels of the blur.

5. A non-transitory computer readable memory storing a program to be executed in a computer, wherein said program includes each step in a method according to claim 1.

6. An image processing system comprising:
a reading unit which reads an original character image to generate image data;
a computer which receives the image data generated by said reading unit, thins a character represented by the image data, fattens an outline of the thinned character, detects a blur of the character represented by the image data by comparing image data which represents the character whose outline is fattened with image data generated by reading an original image, removes the detected blur in the image data, and outputs the image data in which the blur is removed; and
a printer which prints an image based on the image data output from said computer on a printing medium.

7. The system according to claim 6, wherein the computer further performs tearing off of pixels in an area which surrounds the character, from an outside in the area toward an inside in the area.

8. The system according to claim 6, wherein the computer obtains the difference between the image data which represents the character whose outline is fattened and the image data generated by reading the original image for corresponding pixel values, compares the difference with a predetermined threshold, and determines pixels serving as candidate pixels of the blur.

9. The system according to claim 8, wherein the computer determines one of the candidate pixels as a pixel of the blur, based on a relative positional relationship between the candidate pixels of the blur.

10. An image processing apparatus comprising:
a reading unit configured to read an original character image to generate image data;
a thinning unit configured to thin a character represented by the image data;
an expansion unit configured to fatten an outline of the character thinned by said thinning unit;
a detection unit configured to detect a blur of the character represented by the image data generated by said reading unit by comparing image data processed by the expansion unit with image data generated by reading an original image;
a removal unit configured to remove, in the image data, the blur detected by said detection unit;
an output unit configured to output the image data in which said removal unit removes the blur; and
a printer unit configured to print an image based on the image data output from said output unit.

11. The apparatus according to claim 10, wherein the thinning unit is further configured to tear off pixels in an area which surrounds the character, from an outside in the area toward an inside in the area.

12. The apparatus according to claim 10, wherein the detection unit is further configured to obtain the difference between image data processed by the expansion unit and image data generated by reading the original image for corresponding pixel values, compare the difference with a predetermined threshold, and determine pixels serving as candidate pixels of the blur.

13. The apparatus according to claim 12, wherein the detection unit is further configured to determine one of the candidate pixels as a pixel of the blur, based on a relative positional relationship between the candidate pixels of the blur.

\* \* \* \* \*